(12) United States Patent
Barnhoefer et al.

(10) Patent No.: US 8,217,889 B2
(45) Date of Patent: Jul. 10, 2012

(54) PULSE-WIDTH MODULATION CONTROL FOR BACKLIGHTING OF A VIDEO DISPLAY

(75) Inventors: Ulrich Barnhoefer, Sunnyvale, CA (US); Wei Yao, Fremont, CA (US); Taesung Kim, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 707 days.

(21) Appl. No.: 12/369,458

(22) Filed: Feb. 11, 2009

(65) Prior Publication Data

US 2010/0117549 A1 May 13, 2010

Related U.S. Application Data

(60) Provisional application No. 61/113,141, filed on Nov. 10, 2008.

(51) Int. Cl.
*G09G 3/36* (2006.01)
(52) U.S. Cl. ....................................... 345/102
(58) Field of Classification Search .................. 345/30, 345/55, 76, 87, 102; 315/246
See application file for complete search history.

(56) References Cited

U.S. PATENT DOCUMENTS

| 2005/0068289 | A1* | 3/2005 | Diefenbaugh et al. | 345/102 |
|---|---|---|---|---|
| 2005/0134547 | A1* | 6/2005 | Wyatt | 345/102 |
| 2005/0184933 | A1* | 8/2005 | Tomohara | 345/76 |
| 2007/0285382 | A1* | 12/2007 | Feng | 345/102 |
| 2008/0074381 | A1* | 3/2008 | Kumamoto | 345/102 |
| 2009/0295706 | A1* | 12/2009 | Feng | 345/102 |
| 2010/0020002 | A1* | 1/2010 | Van Woudenberg et al. | 345/102 |
| 2010/0085295 | A1* | 4/2010 | Zhao et al. | 345/102 |
| 2010/0097412 | A1* | 4/2010 | Okabe | 345/691 |

\* cited by examiner

*Primary Examiner* — Nitin Patel
*Assistant Examiner* — Jeffrey A Parker
(74) *Attorney, Agent, or Firm* — Ropes & Gray LLP

(57) ABSTRACT

A pulse-width modulated backlight control for a video display restarts the pulse-width modulated pulse train on occurrence of a video refresh pulse. In order to prevent an undesirable momentary increase in brightness in the event that the last pulse of the pre-refresh pulse train occurs too close to the first pulse of the post-refresh pulse train relative to the normal pulse interval, the width of the first pulse following refresh may be reduced from a first value determined by the desired brightness to a second value that bears the same proportion to the first value that the interval between the beginning of the previous pulse and the occurrence of the refresh pulse bore to the normal pulse interval. In that way, the duty cycle during the shortened pulse interval is the same as during a normal pulse interval, avoiding or minimizing perceptible increase in backlight brightness.

11 Claims, 4 Drawing Sheets

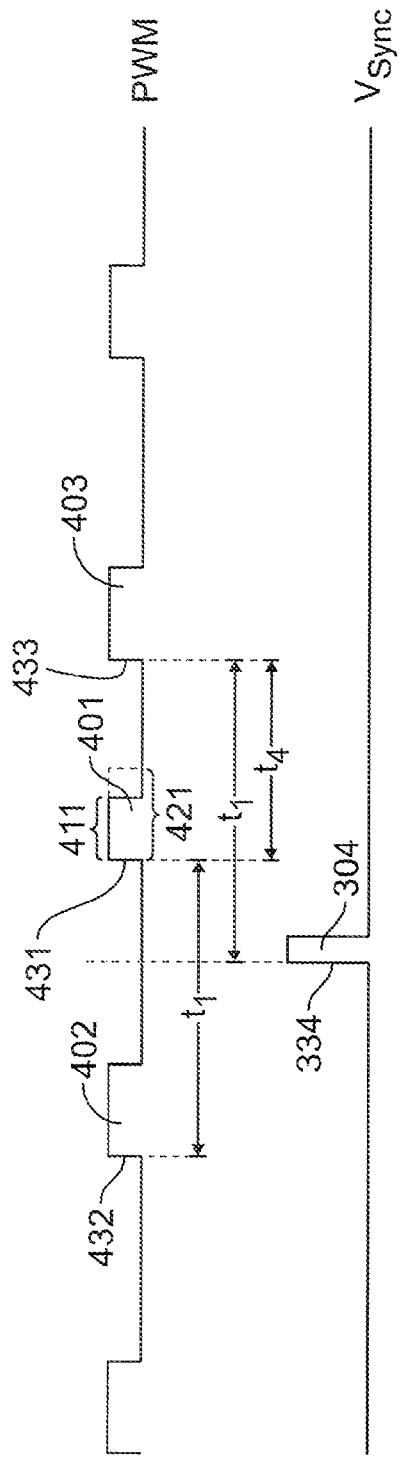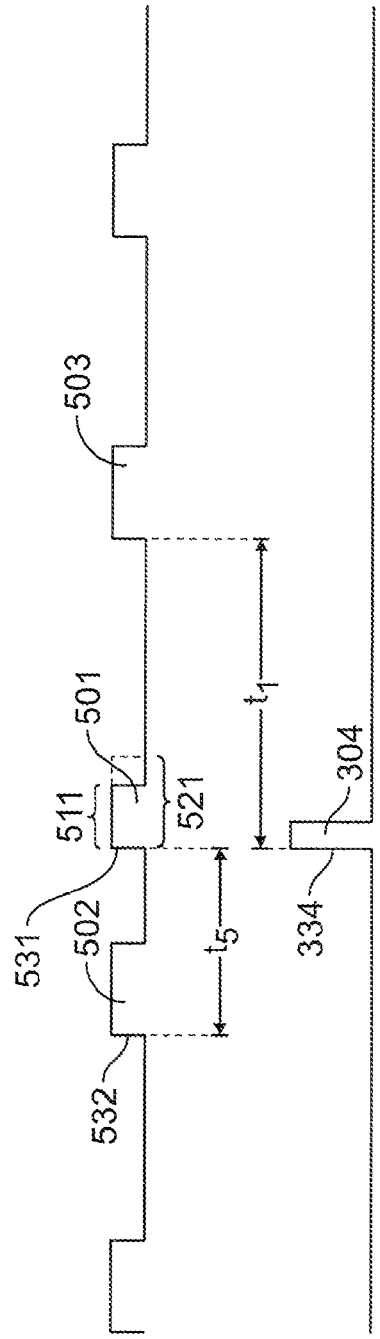

PULSE-WIDTH MODULATION CONTROL FOR BACKLIGHTING OF A VIDEO DISPLAY

CROSS REFERENCE TO RELATED APPLICATION

This claims the benefit of commonly-assigned U.S. Provisional Patent Application No. 61/113,141, filed Nov. 10, 2008, which is hereby incorporated by reference herein in its entirety.

BACKGROUND OF THE INVENTION

This invention relates to controlling the backlighting of a video display. In particular, this invention relates to control of backlighting separately from the video display itself without introducing visual artifacts in the display.

In early video displays based on cathode-ray tube technology, the display generated its own light. However, in many types of solid-state video displays, the elements that display the video data do not generate their own light, and must be coupled with a separate light source. For example, liquid crystal displays operate by selectively lightening and darkening elements in an array, allowing light to shine through from behind the array. In such displays, the light source is generally a backlight, although for some displays, light may be provided from the sides, using reflectors, light pipes, etc., to spread the light out behind the liquid crystal array.

One type of light source commonly used in such displays includes fluorescent lamps. More recently, however, in order to reduce power consumption, and to save space, thereby allowing thinner displays, solid-state light sources have been introduced. For example, light-emitting diodes can be used, either in an array behind the liquid-crystal image-forming array, or as sidelights, with the light distributed behind the image-forming array using reflectors, light pipes, etc., as described above.

It is sometimes necessary to vary the brightness of a video display. This may be a function of the image being displayed, or it may be done to conserve power (e.g., in a portable device, the brightness may be reduced when operating on battery power, particularly during idle periods). One way of controlling the brightness is by pulse width modulation, in which a current pulse of duration $t_2$ is sent during each interval of duration $t_1$ to power the light source. Maximum brightness may be achieved when $t_2$ is a certain fraction $f$ of $t_1$, where $f \leq 1$. By narrowing each pulse—i.e., shortening the pulse width, so that $t_2 < ft_1$, the brightness can be reduced. The magnitude of each current pulse may remain constant.

The video array itself may have a certain refresh rate, which may be determined, for example, by the video standard being displayed, such as, e.g., NTSC, ATSC, VGA, SVGA, XVGA, etc. The video refresh rate may be totally independent of the pulse-width modulation pulse rate $1/t_1$. This complete lack of a fixed-phase relationship between the two signals may result in motion artifacts (e.g., a "waterfall" effect) in the video display when the refresh pulses do not coincide with the pulse-width modulated current pulses, for which there may be a number of solutions.

One solution is to synchronize the video refresh rate and the pulse-width modulation pulse rate of the backlight control current, so that the pulse-width modulation pulse rate of the backlight control current is an integer multiple of the refresh rate. This solution requires deriving both signals from a common clock source (e.g., a quartz crystal).

Another solution is to greatly increase the pulse-width modulation pulse rate of the backlight control current, so that when a video refresh pulse occurs, it will be very close to a backlight control current pulse so as to be nearly synchronous to the current pulse.

For example, a common video refresh rate is 60 Hz, while a common pulse-width modulation pulse rate for the backlight control current is 600 Hz. Either the 600 Hz backlight control current pulses may be synchronized with the 60 Hz refresh pulses, or the pulse-width modulation pulse rate of the backlight control current may be increased to between about 20 kHz and about 30 kHz. However, the video subsystem and the backlight subsystem are typically completely separate, so that synchronizing both rates using a common clock source is not practical or desirable, and very high pulse-width modulated backlight control current pulse rates also are not desirable.

Another solution might be to restart the pulse-width modulated backlight control current pulse train on each occurrence of a refresh pulse. However, because the pulse rate and the refresh rate may be completely independent, it may occur, by happenstance, depending on how the two cycles overlap, that a current pulse will have occurred just before a refresh pulse. Then, if the pulse train is restarted on occurrence of the refresh pulse, another current pulse will occur. The occurrence of two current pulses close together may cause a noticeable, if momentary, brightness increase or "flicker," which also is undesirable.

SUMMARY OF THE INVENTION

In accordance with the present invention, in a pulse-width modulated backlight control for a video display, the pulse-width modulated backlight control current pulse train is resynched to the video refresh rate on occurrence of a video refresh pulse. In order to prevent an undesirable momentary increase in brightness, or flicker, in the event that the pulse train is restarted soon after a pulse has occurred relative to the normal pulse interval, this resynchronization does not result in immediate restart of the pulse-width modulated backlight control current pulse train at full pulse width. Instead, the width, and possibly the timing, of the first backlight control current pulse after resynchronization are adjusted so that the duty cycle remains constant, to avoid any perceptible flicker.

In one embodiment, the first backlight control current pulse after resynchronization occurs essentially on occurrence of the video refresh pulse, so that it is closer to the previous backlight control current pulse than a normal pulse-width modulation pulse interval. In this embodiment, to mitigate the flicker effect of having the first backlight control current pulse after resynchronization closer than normal to the previous pulse, the width of the first backlight control current pulse after resynchronization is reduced from a first value determined by the desired brightness to a second value that bears the same proportion to the first value that the interval between the beginning of the previous backlight control current pulse and the beginning of the first backlight control current pulse bears to the normal pulse interval. Thus, the average duty cycle, over the combination of the shortened pulse interval before the video refresh pulse and the first pulse interval after the video refresh pulse, is constant, minimizing or eliminating perceptible flicker.

In a second embodiment, the first backlight control current pulse after resynchronization still occurs one pulse-width modulation pulse interval after the rising edge of the previous backlight control current pulse, while the second backlight control current pulse after resynchronization occurs one pulse-width modulation pulse interval after the rising edge of the video refresh pulse. To mitigate the flicker effect from having those first and second pulses closer together than one pulse-width modulation pulse interval, the width of the first backlight control current pulse may be reduced from a first value determined by the desired brightness to a second value that bears the same proportion to the first value that the interval between the beginning of the first backlight control current pulse and the beginning of the second backlight control current pulse bears to the normal pulse interval. In that way, the duty cycle during the shortened pulse interval is the same as that during a normal pulse interval, and there is no perceptible increase in backlight brightness.

By definition, the first backlight control current pulse after resynchronization occurs during a new video frame. In some cases, characteristics of the next video frame may require a brightness change. Therefore, the unadjusted pulse width after resynchronization may be different from the unadjusted pulse width before resynchronization. In either of the two embodiments described above, the pulse width update for any brightness change that may be required can occur either in the first backlight control current pulse after resynchronization or the second backlight control current pulse after resynchronization. In the former case, the adjustment of the pulse width may be applied to the updated pulse width.

Thus, in accordance with the present invention there is provided a method for controlling a backlight associated with a video display, the video display having a refresh rate. The method includes generating a train of pulse-width modulated current pulses, each of the pulse-width modulated current pulses having a pulse width determined by a leading edge and a trailing edge (i.e., a rising edge and falling edge for a positive-going pulse, or a falling edge and a rising edge for a negative-going pulse) and determined by desired backlighting parameters of a present frame, and leading edges of successive ones of the pulses being separated by a uniform pulse interval. On occurrence of a refresh of the video display after an incomplete pulse interval following one of the pulse-width modulated current pulses to start a next frame, the pulse train is restarted and the pulse width of a subsequent pulse is shortened so that the pulse width of the subsequent pulse is reduced from a first value determined by the desired backlighting parameters to a second value that bears a same proportion to the first value that the duration between the beginning of the incomplete pulse interval and a leading edge of the refresh pulse bears to the uniform pulse interval. A pulse following the subsequent pulse occurs one uniform pulse interval following the leading edge of the refresh pulse.

A video display operated in accordance with the method also is provided.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which:

FIG. 4 is a graphical representation of a first embodiment of a method according to the present invention;

FIG. 5 is a graphical representation of a second embodiment of a method according to the present invention.

DETAILED DESCRIPTION OF THE INVENTION

Figure 1:
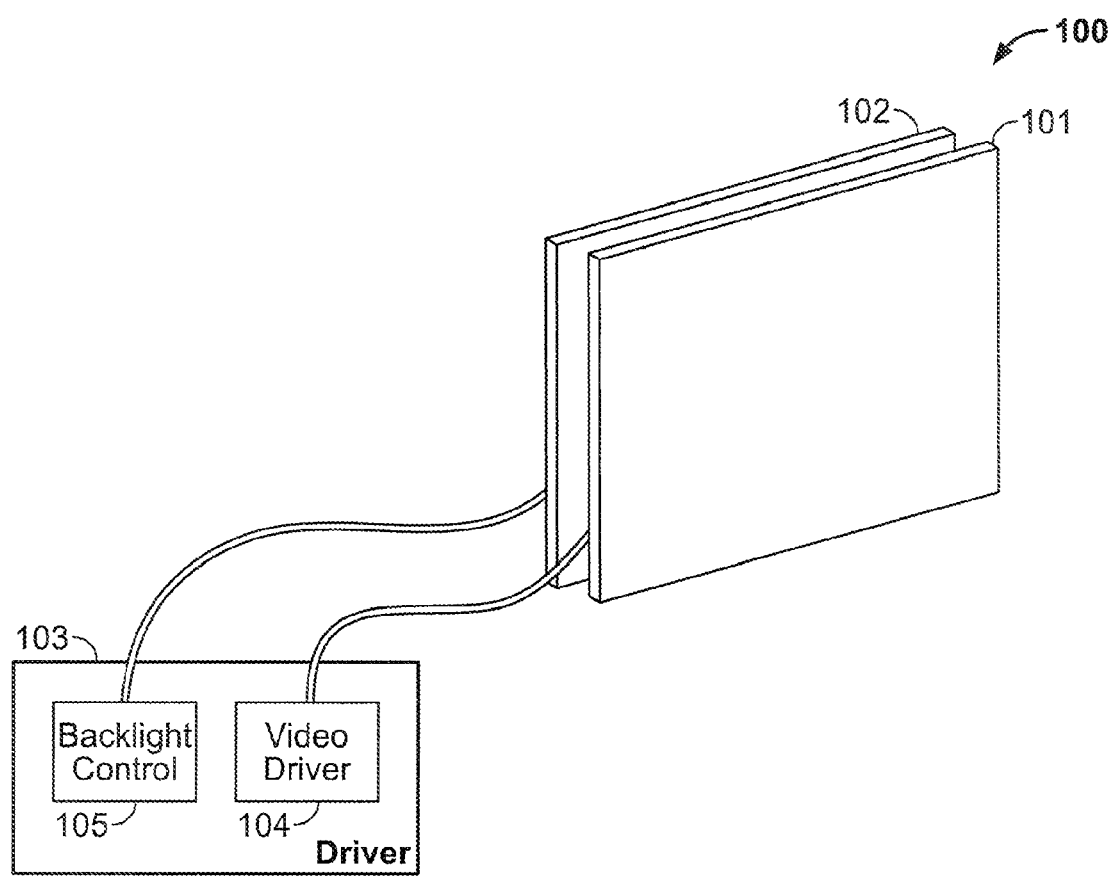
FIG. 1 is a simplified schematic representation of a video display with which the present invention may be used.

FIG. 1 shows, schematically, a video display 100 of the type with which the present invention may be used. Video display 100 includes a video array 101 which may be, e.g., a liquid crystal array as described above, and a backlighting source 102. Although backlighting source 102 is shown as having an area coextensive with that of video array 101, the actual light source of backlighting source 102 may occupy a small area, and its output may be spread over video array 101 using appropriate reflectors, light pipes, etc. (not shown).

Driver circuitry 103 may include a video driver 104 that drives video array 101, and a separate backlight control 105 for backlighting source 102.

Figure 2:
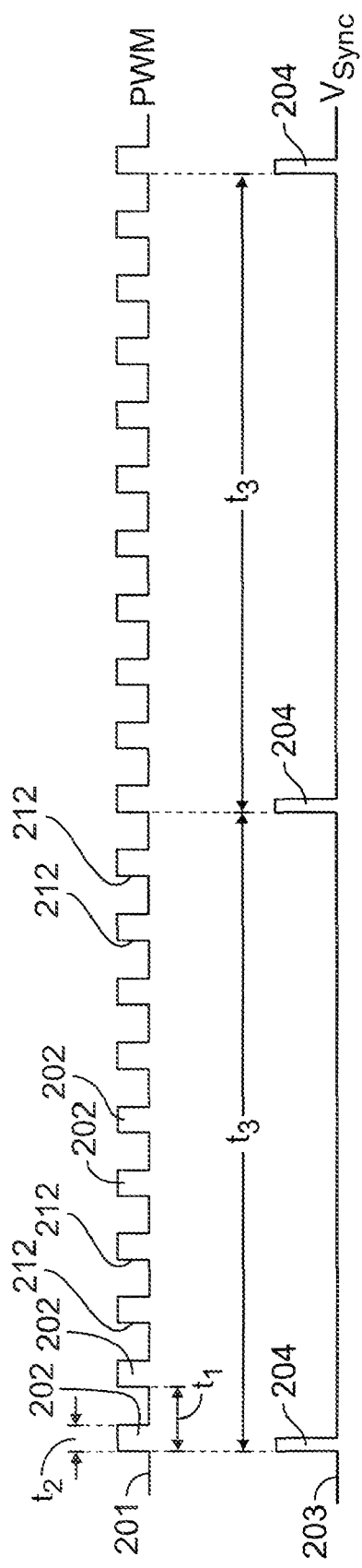
FIG. 2 is a graphical representation showing a backlighting control pulse train that is synchronized with a video refresh signal.

FIG. 2 shows a train 201 of pulse-width modulated current pulses 202 for controlling backlighting unit 102. The pulse interval $t_1$ is the duration between the rising edges 212 of adjacent pulses 202. The brightness of backlighting source 102 may be determined by the duty cycle of pulse train 201—i.e., the proportion that the width or duration $t_2$ of each pulse 202 bears to the pulse interval $t_1$, which may be expressed as a percentage, or as a fraction f. Although the accompanying drawings show positive-going pulses and the discussion that follows refers to the rising and falling edges of those pulses, the invention also applies where the pulses are negative-going. Accordingly, any discussion of rising and falling edges should be considered a discussion of falling and rising edges in the case of negative-going pulses. More generally, one may refer to the leading and trailing edges of the pulses.

Also shown in FIG. 2 is a voltage waveform $v_{sync}$, made up of a train 203 of refresh pulses 204 occurring at a refresh interval $t_3$ which generally is much longer than pulse interval $t_1$. Generally, one may expect refresh interval $t_3$ to be at least about ten times as long as pulse interval $t_1$.

In the example of FIG. 2, pulse-width modulated pulse train 201 is synchronized with $v_{sync}$ or refresh pulse train 203, with each refresh pulse 204 coinciding with a pulse-width modulated current pulse 202. In this case, no visual artifacts are produced.

Figure 3:
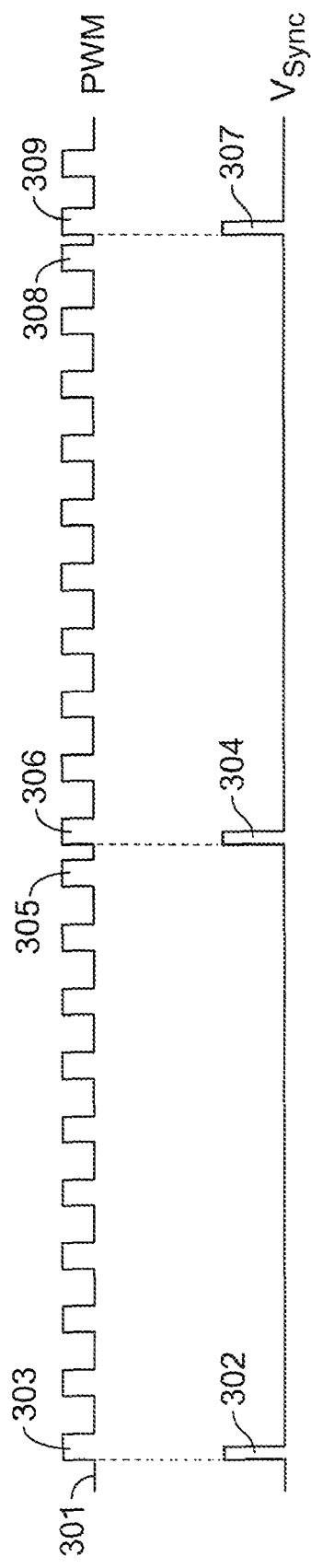
FIG. 3 is a graphical representation showing a backlighting control pulse train that is not synchronized with a video refresh signal.

In the situation shown in FIG. 3, on the other hand, the refresh pulses do not always coincide with one of the pulse-width modulated current pulses of pulse train 301. In particular, while refresh pulse 302 coincides with current pulse 303, refresh pulse 304 occurs shortly after current pulse 305 and refresh pulse 307 occurs shortly after current pulse 308. The resulting restart of the pulse-width modulated current pulse train causes current pulse 306 to occur much closer than normal to current pulse 305 and current pulse 309 to occur much closer than normal to current pulse 308, giving rise to the increased brightness, and therefore flicker, referred to above. It will be appreciated, of course, that refresh pulse 304 could occur at any time relative to the current pulses of pulse train 301. Nevertheless, any degree of closeness between pulses 305 and 306 could give rise to at least some visual artifact.

In an alternative situation (not shown), the pulse-width modulated current pulse train is not synchronized with the refresh pulse train, and is not restarted on occurrence of a refresh pulse. That situation would give rise to the aforementioned "waterfall" effect.

In accordance with one embodiment of the invention, as shown in FIG. 4, first backlight control current pulse 401 after resynchronization occurs at interval $t_1$ following the previous backlight control current pulse 402 before resynchronization, and the second backlight control current pulse 403 after resynchronization occurs at interval $t_1$ following refresh pulse 304. In this embodiment, even though pulse 402 occurs after refresh pulse 304, it may be considered the last pulse of the pre-refresh pulse train. This results in pulse 401 and pulse 403 being separated by an interval equal to the interval between the rising edge of pulse 402 and the rising edge of refresh pulse 304, rather than interval $t_1$. The amount by which this closer than interval $t_1$ depends on how soon pulse 304 occurred after pulse 402.

In any event, according to this embodiment, the width of pulse 401 is shortened so that the proportion that the adjusted width 411 of pulse 401 bears to the unadjusted width 421 of pulse 401 is the same as the proportion that the interval between the rising edge 431 of pulse 401 and the rising edge 433 of pulse 403 bears to the uniform or standard pulse interval $t_1$, which is the same as the proportion that the interval between the rising edge 432 of pulse 402 and the rising edge 334 of pulse 304 bears to the standard pulse interval $t_1$. Accordingly, the duty cycle over the shortened interval $t_4$ between pulse 401 and pulse 403 is the same as during a standard pulse interval $t_1$.

According to a second embodiment shown in FIG. 5, first backlight control current pulse 501 after resynchronization occurs substantially at the same time as refresh pulse 304, and all subsequent pulses are spaced apart by the standard pulse interval $t_1$. In this embodiment, pulse 502 may be considered the first pulse of the post-refresh pulse train. This results in pulse 501 and previous pulse 502 being separated by an interval equal to the interval between the rising edge of pulse 502 and the rising edge of refresh pulse 304, rather than interval $t_1$. The amount by which this closer than interval $t_1$ depends on how soon pulse 304 occurred after pulse 402.

In any event, according to this embodiment, the width of pulse 501 is shortened so that the proportion that the adjusted width 511 of pulse 501 bears to the unadjusted width 521 of pulse 501 is the same as the proportion that the interval between the rising edge 532 of pulse 502 and the rising edge 531 of pulse 501 bears to the standard pulse interval $t_1$, which is the same as the proportion that the interval between the rising edge 532 of pulse 502 and the rising edge 334 of pulse 304 bears to the standard pulse interval $t_1$. Accordingly, the average duty cycle over the shortened interval $t_5$ between pulse 502 and pulse 501 and the following pulse interval is the same as during a standard pulse interval $t_1$.

If in the embodiment of FIG. 5, refresh pulse 304 occurs before pulse 502 is complete, pulse 502 is allowed to complete, and then is immediately followed by pulse 501. This again maintains the average duty cycle over the two intervals containing pulse 502 and pulse 501 the same as during a standard pulse interval $t_1$.

In either embodiment, the second pulse 403, 503 following refresh pulse 304 occurs one standard pulse interval $t_1$ following refresh pulse 304.

It may be that the requirements of the video frame to be displayed following refresh pulse 304 require a brightness change. This can be handled in two ways, regardless of whether the embodiment of FIG. 4 or the embodiment of FIG. 5 is being used. According to one variant, the brightness change is introduced immediately on occurrence of refresh pulse 304. According to this variant, the adjustment of pulse width 411 or 511 must also account for the brightness change. Although this is possible, it may be mathematically complex. Therefore, according to a second variant, the brightness change is not applied until pulse 403, 503. This one-pulse delay in applying the brightness change should not cause any perceptible visual artifact.

Figure 6:
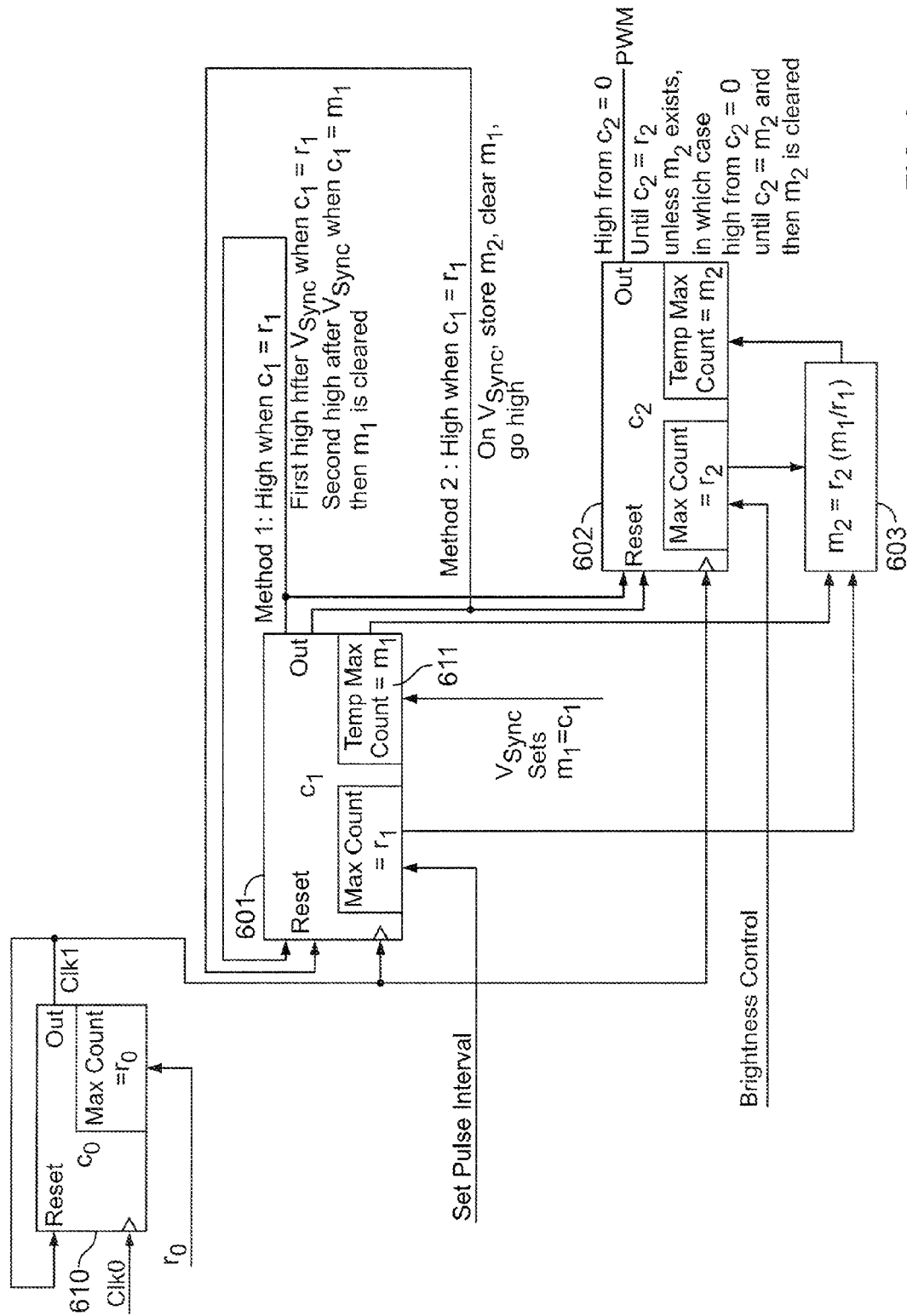
FIG. 6 is a diagram of circuitry according to the present invention.

FIG. 6 shows an embodiment of a counter arrangement 600 for implementing the invention. $c_1$ counter 601 controls the standard pulse interval $t_1$ between the pulse-width modulated backlight control current pulses in pulse train 301, while $c_2$ counter 602 controls the pulse width of the individual pulse-width modulated backlight control current pulses.

$c_0$ counter 610 supplies CLK1 clock 620 which clocks counters 601, 602. As such, CLK1 is significantly faster (e.g., between about 100 times and several tens of thousands of times faster) than the pulse rate of pulse train 301. For example, the pulse rate of pulse train 301 may be between about 300 Hz and about 30 kHz, while CLK1 may be between about 4096 times faster and about 16,384 times faster. Counter 610 is itself clocked by an even higher-speed system clock CLK0 (e.g., a 200 MHz clock) to generate CLK1. Counter 610 may be loaded with a maximum count value $r_0$ that determines CLK1=CLK0/$r_0$. Alternatively, an independent clock circuit (not shown) may generate CLK1 directly.

Similarly, counter 601 may be loaded with a maximum count value $r_1$ that determines $t_1=1/(CLK1/r_1)$, while counter 602 may be loaded with a maximum count value $r_2$ that determines $t_2=1/(CLK1/r_2)=t_1(r_2/r_1)$. r2 may be changed by driver circuitry 103 according to the brightness requirements of the present image.

These relationships hold as long as no $v_{sync}$ refresh pulse 304 occurs. However, once a refresh pulse 304 occurs, the instantaneous count value $c_1$ in counter 601 is stored at 611 as $m_1$, and used at 603 to derive a new temporary maximum count $m_2$ for counter 602, such that $m_2$ bears the same proportion to $r_2$ that $m_1$ bears to $r_1$, or $m_2=r_2 (m_1/r_1)$.

If operating according to the method shown in FIG. 4, counter 601 is not reset by pulse 304. Instead, it continues to run until $c_1=r_1$, at which point it triggers counter 602. Because there is a value in $m_2$, $m_2$ is used instead of $r_2$ (otherwise $r_2$ would be used) causing a pulse to be output for a duration indicated by $m_2$. $m_2$ is cleared whenever it is used, and therefore the next pulse will again have the duration indicated by $r_2$. Counter 601 then starts again. Because there is a value in $m_1$, $m_1$ is used instead of $r_1$, and counter 602 is triggered after a shortened interval $t_4$ indicated by $m_1$. $m_1$ is then cleared, having been used, so that the next pulse interval will be determined by $r_1$.

If operating according to the method shown in FIG. 5, counter 601, including $m_1$, is reset by pulse 304 after $m_2$ has been stored. This triggers counter 602. Because there is a value in $m_2$, $m_2$ is used instead of $r_2$ causing a pulse to be output for a duration indicated by $m_2$. $m_2$ is cleared whenever it is used, and therefore the next pulse will again have the duration indicated by $r_2$. Because $m_1$ has been reset, that next pulse will occur after the standard interval determined by $r_1$.

It will be understood that the foregoing is only illustrative of the principles of the invention, and that various modifications can be made by those skilled in the art without departing from the scope and spirit of the invention. One skilled in the art will appreciate that the present invention is not limited by the disclosed embodiments, which are presented for purposes of illustration and not of limitation, and the present invention is limited only by the claims that follow.

What is claimed is:

1. A method for controlling a backlight associated with a video display, the video display having a refresh rate, the method comprising:

generating a train of pulse-width modulated current pulses, each of the pulse-width modulated current pulses having a pulse width determined by a leading edge and a trailing edge and determined by desired backlighting parameters of a present frame, and leading edges of successive ones of the pulses being separated by a uniform pulse interval; and on occurrence of a refresh of the video display after an incomplete pulse interval following a preceding one of the pulse-width modulated current pulses to start a next frame, restarting the pulse train and shortening the pulse width of a subsequent pulse so that the pulse width of the subsequent pulse is reduced from a first value determined by the desired backlighting parameters to a second value that bears a same proportion to the first value that the duration between the beginning of the incomplete pulse interval and the leading edge of the refresh pulse bears to the uniform pulse interval; wherein:

a pulse following the subsequent pulse occurs one uniform pulse interval following the leading edge of the refresh pulse.

2. The method of claim 1 wherein:
the refresh pulse occurs between pulses of the pulse train; and
the subsequent pulse is started substantially on occurrence of the refresh pulse.

3. The method of claim 1 wherein:
the refresh pulse occurs between pulses of the pulse train; and
the subsequent pulse is started after completion of one uniform pulse interval following a pulse.

4. The method of claim 1 wherein:
the refresh pulse occurs between the leading edge and the trailing edge of the preceding pulse of the pulse train;
the preceding pulse is allowed to complete to its trailing edge; and
the subsequent pulse is started upon completion of the preceding pulse.

5. The method of claim 1 wherein the subsequent pulse is a pulse that is modulated for the current frame.

6. The method of claim 1 wherein the subsequent pulse is a pulse that is modulated for the next frame.

7. A video display comprising:
a video array having a refresh rate; and
a backlight; wherein:
the backlight is controlled by a method comprising:
generating a train of pulse-width modulated current pulses, each of the pulse-width modulated current pulses having a pulse width determined by a leading edge and a trailing edge and determined by desired backlighting parameters of a present frame, and leading edges of successive ones of the pulses being separated by a uniform pulse interval, and on occurrence of a refresh of the video display after an incomplete pulse interval following a preceding one of the pulse-width modulated current pulses to start a next frame, restarting the pulse train and shortening the pulse width of a subsequent pulse so that the pulse width of the subsequent pulse is reduced from a first value determined by the desired backlighting parameters to a second value that bears a same proportion to the first value that the duration between the beginning of the incomplete pulse interval and the leading edge of the refresh pulse bears to the uniform pulse interval, wherein:

a pulse following the subsequent pulse occurs one uniform pulse interval following the leading edge of the refresh pulse.

8. The video display of claim 7 wherein the backlight comprises a control circuit, the control circuit comprising:
a first counter that determines the pulse interval; and
a second counter that determines the pulse width.

9. The video display of claim 8 wherein:
the first counter stores a maximum first count that determines the pulse interval;
the first counter stores a present first count on occurrence of a refresh and uses the stored present first count once to determine the pulse interval and then clears the present first count;
the second counter stores a maximum second count that determines the pulse width; and
the second counter stores a present second count that bears to the maximum second count a proportion that the present first count bears to the maximum first count and uses the present second count once to determine the pulse width and then clears the present second count.

10. The video display of claim 9 wherein the first counter uses the stored present first count upon occurrence of the refresh.

11. The video display of claim 9 wherein the first counter uses the stored present first count after first completing the maximum first count.

* * * * *